United States Patent [19]

Reiser et al.

[11] Patent Number: 4,984,736
[45] Date of Patent: Jan. 15, 1991

[54] HEATER FOR MOTOR VEHICLES WHICH CAN BE OPERATED ON SEVERAL POWER SETTINGS

[75] Inventors: Peter Reiser, Esslingen; Edwin Steiert, Stuttgart; Wolfgang Schaffert, Aichschiess, all of Fed. Rep. of Germany

[73] Assignee: J. Eberspächer, Esslingen, Fed. Rep. of Germany

[21] Appl. No.: 363,679

[22] Filed: Jun. 9, 1989

[30] Foreign Application Priority Data

Jun. 15, 1988 [DE] Fed. Rep. of Germany ....... 3820442

[51] Int. Cl.$^5$ ............................................ G05D 23/00
[52] U.S. Cl. ............................. 237/2 A; 237/12.3 C; 431/78; 431/75; 236/21 R
[58] Field of Search ............ 431/77, 75, 78, 69, 431/70, 80, 18; 237/2 A, 12.3 C; 236/21 R

[56] References Cited

U.S. PATENT DOCUMENTS 4,389,184 6/1983 Tanaka et al. ...................... 431/77

FOREIGN PATENT DOCUMENTS 3517953 11/1986 Fed. Rep. of Germany .
57-16721 1/1982 Japan ...................................... 431/75

Primary Examiner—Albert J. Makay
Assistant Examiner—John Sollecito
Attorney, Agent, or Firm—McGlew & Tuttle

[57] ABSTRACT

By temperature gradient detection it is determined for the liquid combustion chamber auxiliary heater for motor vehicles, whether e.g. a flame blow-off has taken place, which has to be interpreted as a malfunction and hwich necessitates the discontinuation of fuel supply. Alternatively, it might merely show the switching from a high setting to a low setting. In the latter case a temperature drop to a lower operation temperature occurs also. However, the temperature drop is not as steep as in the case of a flame blow-off. At certain points in time $t_1$ the target temperature for a point in time $t_2$ is calculated by the detected temperature according to a certain algorithm having specific device properties as parameters. At this point in time the calculated target temperature is checked for errors.

4 Claims, 1 Drawing Sheet

HEATER FOR MOTOR VEHICLES WHICH CAN BE OPERATED ON SEVERAL POWER SETTINGS

BACKGROUND OF THE INVENTION

Field of the Invention

The invention relates in general to heaters and, in particular, to a new and useful heater for motor vehicles which can be operated on several power settings.

Such heaters are used as auxiliary heaters or heaters which are in action when the car is not running. Such heaters include e.g. separate heating or add-on heaters in buses, trucks, soil moving vehicles and similar vehicles, and also in automobiles. There are various types of such heaters including heaters using either water or air as the heating medium; other criteria are type and setting of the heater, there are e.g. vaporizing burners, pressure pulverizers and rotary atomizing burners. Another distinguishing factor is the kind of ignition, e.g. by means of a spark plug or a glow plug.

There are certain rules and regulations for the operation of such a heater. One of these regulations is that once the burner has started, and, in particular, after the beginning of the fuel transport, the flame has to burn within 180 seconds. Another regulation requires that if the flame dies during stationary operation, the absence of the flame has to be recognized within 240 seconds so that the fuel supply can be stopped in time to avoid the flow of a large amount of fuel into the burner chamber which represents a potential source of danger.

The above regulations for the operation of the burner necessitate a direct or an indirect flame control. A direct flame control is e.g. achieved by means of an optical sensor, e.g. a photo-transistor delivering an output signal as long as it is illuminated by the bright flame. In some cases, however, it is not possible to install an optical sensor inside the burner chamber. In this case a thermo-element which is not arranged inside the burner chamber, but on the outside of the burner chamber wall or on the heat exchanger could be used. A prerequisite for the use of such a thermoelement is that it will react relatively fast, and therefore, that the burner chamber wall or the heat exchanger wall has good conductive properties, i.e. it is not thermally inert.

The use of thermo-elements on the outside of the burner chamber wall or the heat exchanger wall is problematic in cast metal heat exchangers, which are usually made of aluminum. In these heat exchangers the temperature on the outside of the burner chamber wall or the heat exchanger wall changes only relatively slowly. Up until now a bi-metal switch has been used which opens (or closes) upon starting of the heater once a certain temperature is exceeded and thus indicates the lighting of a flame. When the temperature falls below a certain second point, the bi-metal switch closes (opens) to indicate the absence of the flame. Such bi-metal switches are relatively safe. They are adjusted during the production of the heaters for the respective heater types in dependence on the speed with which temperature changes occur on the outside wall of the burner chamber or the heat exchanger.

The use of these two-position switches, which react relatively slowly, is problematic in heaters which can work on several, e.g. on two power settings. For, if the heater is switched from a relatively high setting to a lower setting, this is followed by a relatively large drop in temperature upon which the temperature is maintained at to a relatively low level. The relatively low temperature level at the "LOW" setting is so low that upon the flame blow-off from the "HIGH" setting the temperature is not reached within the required four minutes. Possibly the low temperature level is even below the switch-temperature for flame recognition.

German patent No. 35 17 953 A1 describes a heater with a control device for the heat setting. The temperature gradient between two temperature thresholds for the heating of the heat exchange medium is determined for control of the heater. The arrangement detects how long it takes the heat exchange medium to be heated up between a first and a second temperature threshold. This period of heating up is compared to a specific set value and, depending on the result of the comparison various ranges of control are passed through. This kind of control is not suitable for a flame control which is capable of registering that the ignition has failed and which can also register a flame blow-off during normal operation.

SUMMARY OF THE INVENTION

The invention provides a heater operating on several settings and having a reliable flame control by means of one single indirectly operating sensor even when the heater is operated on several settings.

The sensor used according to the invention is not new in itself. It is e.g. a PCT resistor, a thermoelement or a similar unit emitting an electric signal whose amplitude depends on the temperature detected. The control circuit interprets this signal so that a value is formed repeatedly, e.g. at regular intervals, which is characteristic for the speed of the changes in temperature, i.e. for the speed of a rise or a drop in temperature. In other words: gradient values are detected, which characterize the tendency of the temperature change.

By means of preliminary tests certain changes of temperature at the location of the sensor are detected for various operation modes and stored as set values.

Furthermore, when the burner works in stationary operation, i.e. the temperature at the sensor is constant within relatively restricted bounds, the flame is blown off and the consequent temperature drop at the sensor is detected. Once the flame is blown off, the temperature inside the burner chamber drops relatively rapidly Due to the thermal inertia of the heat exchanger construction, the temperature on the outer wall of the heat exchanger drops only relatively slowly. Correspondingly the temperature drop due to a switch from a high setting to a low setting is detected at the sensor.

The values thus detected are e.g. stored in the memory of a microprocessor serving as a control circuit.

During the operation of the heater temperature gradient values are formed and compared to the respective stored gradient values. This occurs at certain predetermined intervals. The comparison determines whether a drop or a rise in temperature has taken place (the latter is of interest when starting the heater). The determination of the correspondence or lack of correspondence of the continuously taken gradient values with the stored values is effected by means of subtraction. If the respective limit value falls below a certain tolerance value, this is regarded as correspondence. Upon starting of the heater the signals emitted by the sensor are transformed into gradient values. These gradient values correspond to one or several tangent lines to the temperature-increase-curve. A comparison to the previously stored temperature-increase values shows whether the flame has been ignited or not. With regard to the prescribed safety regulations, the procedure according to the invention allows of the determination of whether the ignition period of 180 seconds after the starting of the heater has been complied with even before the end of the 180 seconds. If the comparison of the actual temperature gradient with the previously stored gradient yields the result that no increase in temperature characterizing the ignition of a flame is given, then the fuel supply is cut off.

In the event of a drop in temperature, gradient values are also detected and compared to the previously stored values. The distinction between a flame blow-off and a switching to a lower setting is based on the fact that the temperature drop during a flame blow-off is steeper than during the change to a lower setting. By comparing results, a decision can be made as to whether the temperature drop is due to a malfunction, i.e. a flame blowoff, or merely to the switching to a lower setting. In the former case the fuel supply has to be cut off, in the latter case no measures need be taken.

The termination of the flame during stationary operation at a low setting can be detected in a similar manner.

In a particularly preferred embodiment of the invention an analysis device of a control circuit for the heater comprises a computer which is designed so that from an actual temperature prevailing at a point in time $t_1$ a target temperature is calculated for a point in time $t_2$ according to an algorithm taking into account specific device properties as parameters. The point in time $t_2$ has a determined distance in time from the point in time $t_1$. At this point in time $t_2$ the actual temperature is calculated, and the results of the advance calculation are compared to the actual temperature. The algorithm is also formulated by means of tests. Herein, specific device properties such as heat conductivity, temperature gradients etc. are taken into account. In this embodiment of the invention the storing of set gradients is not necessary. Merely the algorithm has to be stored.

Accordingly, it is an object of the invention to provide a control for regulating the fuel supply of a fluid fuel burner heater which has a regulatable combustion air supply, feed supply and ignition device and in addition has a multiple setting control and an operational control.

A further object of the invention is to provide a control which includes a sensor associated with the heater for providing a signal for the temperature of operation and which is connected to a control circuit which has a microprocessor or computer which provides a reading of detected values of the sensor and develops a detection interval value associated with the burning of the fuel in the burner.

A further object of the invention is to provide a method of operating a heater which includes a control circuit having a computer with a memory which is connected to a sensor connected with the heater and provides temperature gradient values which are stored for various operational situations in advance of a controlled heater operation and thereby establishes at least gradient values for temperature increase when the device is started, after a flame is blown off (terminates) for both a high and low setting, gradient values for temperature drop upon switching the heater from a high setting to a low setting as operational gradient conditions and which is connected through the center to continuously detect gradient values during all operational conditions of the heater and comparing them with the gradient values which have been established in the memory so as to actuate respective ones of the combustion air supply, the fuel feed supply, and the ignition device as necessary in accordance with the gradient values detected.

A further object of the invention is to provide a control for regulating a fuel supply to a fluid fuel burner heater which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

DESCRIPTION OF THE PREFERRED EMDODIMENTS

Figure 1:
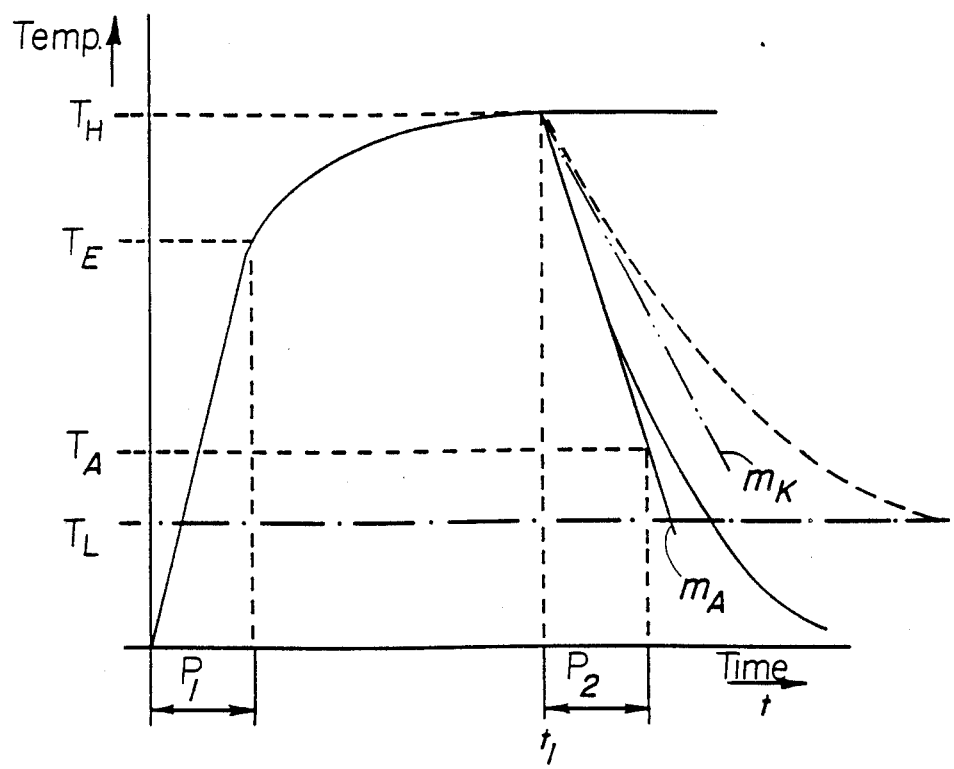
FIG. 1 is a diagrammatical representation of changes of temperature with a heater to explain the invention.

In FIG. 1 the time t is given on the abscissa, the temperatures T on the ordinate. When the burner of the heater is started at the point in time 0, i.e. in particular the fuel supply (diesel or gas) is initiated and the flame is ignited, the temperature T rises exponentially. The rise in temperature takes place in a straight line at first. Upon reaching the temperature $\theta_E$ within a term $P_1$ the burner fulfills the requirement that a flame has been generated within the term $T_1 = 180$ seconds. Then the temperature increases further and eventually it approaches the temperature $T_H$ during stationary operation. This temperature level corresponds to an operation of the heater at a high setting (H = high).

When e.g. the heater is switched to low setting, the heater working at a temperature $T_L$ (L = low), a relatively steep drop in temperature occurs initially until the temperature approaches the constant temperature $T_L$. At the beginning of the temperature drop the gradient of the characteristic of the increase corresponds to a tangent $m_K$ touching the characteristic.

If we now compare the temperature drop after the switching from a large to a low setting to that after the flame blow-off (i.e. a malfunction), we will see that the temperature drop due to a malfunction is considerably steeper. If the flame is blown off at the point in time $t_1$, at first the temperature drops according to a tangent $m_A$ of the characteristic of the temperature drop until the temperature eventually corresponds to the environmental temperature. If the temperature drops below a value $T_A$ within a term $P_2$ after the point in time $t_1$, then this corresponds to the time for the recognition of a flame blow-off or termination required by law.

If upon the flame blow-off the temperature drops further from the constant value $T_L$ the result is an also exponential temperature drop with the respective tangent.

The invention is based on the changes of temperature described above in the area of a sensor arranged on the outer wall of a heat exchanger for the various operational situations.

Figure 2:
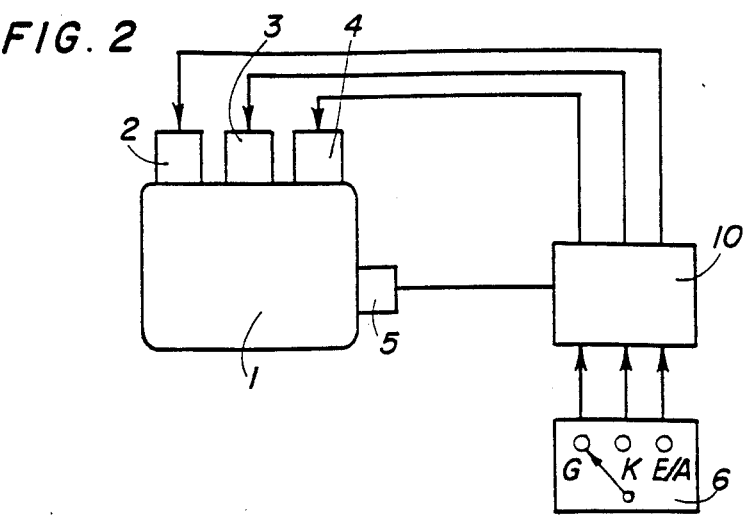
FIG. 2 is a block diagram of a heating device for a motor vehicle having control means connected in accordance with the invention.

Referring to FIG. 2, a heater 1 has an unspecified burner. The fluid fueled heater has a regulatable combustion air supply 2 including a combustion air supply blower 2, fuel supply 3 including a pump 3 and ignition means 4 including a glow plug or spark plug 4. Air is blown into the burner by means of the combustion air blower 2. A dosing pump 3 supplies either a large or a small amount of fuel, depending on the chosen setting, to e.g. a mixing device in the combustion chamber area. A glow plug or spark plug 4 ignites the fuel-air mixture.

The heater 1 is controlled by a control circuit 10, which drives the combustion air blower 2, the dosing pump 3 and the glow plug 4.

A PCT-resistor as a sensor 5 is arranged on the outer wall of the cast metal heat exchanger of the heater 1 and it supplies output signals whose amplitudes are proportional to the temperatures detected.

The control circuit 10 receives the output signals of the sensor 5, and also operation control signals from a control panel 6. As is shown schematically in FIG. 2, the heater can be set on a high setting (H), a low setting (L) or it can be switched off (E/A=ein/aus=on/off) by means of the control panel 6.

The control circuit 10 comprises e.g. a microprocessor, which reads the output values of the sensor 5 at regular intervals and which forms gradient values. This is e.g. effected by dividing two consecutive detected temperature values by a detection-interval-value.

The microprocessor 10 working as the control circuit has a memory in which empirically determined temperature gradient values for various operation situations are stored in advance. There are gradient values for the temperature increase when the device is started, gradient values for a temperature drop after a flame blowoff, in each case for a high and a low setting, and gradient values for the temperature drop upon switching the heater from a high setting to a low setting. The continuously detected gradient values are compared to the various stored gradient values. The compared values are e.g. regarded as corresponding when the difference is smaller than a certain set value. In dependence on the results of the comparison the control 10 does either not react at all or with an emergency action.

The gradient values correspond to tangents to the temperature characteristics according to FIG. 1. If the result of a comparison between an actual gradient value and a previously stored gradient value that the temperature behaves e.g. according to the tangent $m_{AN}$ in FIG. 1, then this means a flame blow-off. In this case the control circuit 10 reacts by sending a switch-off signal to the fuel dosing pump 3 in order to interrupt the fuel supply. Preferably the invention is employed in heaters having a cast metal heat exchanger, which is thermally relatively inert. It can also be used in other heaters, however.

While specific embodiments of the invention have been shown and described in detail to illustrate the application of the principles of the invention, it will be understood that the invention may be embodied otherwise without departing from such principles.

What is claimed is:

1. A heater for motor vehicles which can be operated on several settings as an auxiliary and an add-on heater including a burner running on liquid fuel supplied by a pump and a heat exchanger surrounding a chamber of the burner, comprising operation control means having a control circuit including a sensor reacting to temperature changes emitting a temperature-dependent electrical output signal changeable with time, said control means repeatedly generating values from the electrical output signals of said sensor characterizing the speed with which the temperature changes, wherein said control circuit including analysis means, which compares the values of the speed with which the temperature changes at the heat exchanger, to at least one set value and to thereby determine whether a flame blow-off has occurred or whether no flame was ignited once the burner has been started.

2. A heater according to claim 1, wherein the speed of the temperature changes are compared to several temperature gradient values determined empirically in advance, of which one corresponds to the temperature drop after a flame blow-off and the other to the temperature drop upon switching of the heater from a higher setting to a lower setting, and at least a smallest determined difference between the value of the speed of the temperature change and one or the other temperature gradient values serves as a criterion for correspondence.

3. A heater according to claim 1, wherein said control circuit detects the rise in temperature once the burner is switched on, and if it is lower than a specific preset value, said control circuit interrupts the fuel supply to said burner.

4. A heater according to claim 1, wherein a target temperature $T_2$ is repeatedly calculated by said microprocessor for a point in time $T_2$ from a temperature of $T_1$ at a respective point in time $t_1$ according to an algorithm taking into account specific device properties, and the results of the thus calculated set values are compared to actual temperatures at the point in time $t_2$.

* * * * *